US009736673B2

United States Patent
Liu et al.

(10) Patent No.: US 9,736,673 B2
(45) Date of Patent: *Aug. 15, 2017

(54) METHOD TO AUTOMATICALLY INFER USER SIGNATURE THROUGH CONTEXTUAL LEARNING

(71) Applicant: International Business Machines Corporation, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,493

(22) Filed: Aug. 24, 2015

(65) Prior Publication Data

US 2017/0005978 A1 Jan. 5, 2017

Related U.S. Application Data

(63) Continuation of application No. 14/788,334, filed on Jun. 30, 2015.

(51) Int. Cl.
*H04W 8/00* (2009.01)
*H04L 29/12* (2006.01)
(Continued)

(52) U.S. Cl.
CPC ......... *H04W 8/005* (2013.01); *H04L 61/1547* (2013.01); *H04L 67/303* (2013.01);
(Continued)

(58) Field of Classification Search
CPC ............... H04L 61/1547; H04L 67/303; H04L 61/6081; H04L 61/6022; H04L 61/103;
(Continued)

(56) References Cited

U.S. PATENT DOCUMENTS

2002/0174364 A1    11/2002   Nordman et al.
2004/0258032 A1*  12/2004   Kawamura ............. H04W 8/26
                                                            370/338

(Continued)

OTHER PUBLICATIONS

IBM "List of IBM Patents or Patent Applications Treated As Related".

(Continued)

*Primary Examiner* — Michael Mapa
(74) *Attorney, Agent, or Firm* — Patterson + Sheridan, LLP (57) ABSTRACT

Techniques are disclosed enabling a wireless device to associate other wireless devices within a communication range of the wireless device as belonging to a specific individuals or groups recognized by the wireless device. In one embodiment, a first set of data including an identifier broadcast from the other wireless device in proximity to the wireless device is received by the wireless device. The wireless device identifies a user in a set of event data available on the wireless device. The wireless device evaluates the set of event data and the identifier to correlate the identifier of the other wireless device with the user. Upon determining that the identifier from the other wireless device has an association with the user identified in the set of event data, the wireless device assigns a display label to represent the other wireless device on the wireless device.

7 Claims, 7 Drawing Sheets

(51) Int. Cl.
  *H04L 29/08* (2006.01)
  *H04W 4/00* (2009.01)
  *H04W 4/02* (2009.01)
  *H04W 8/18* (2009.01)
  *H04W 4/08* (2009.01)

(52) U.S. Cl.
  CPC .......... *H04W 4/003* (2013.01); *H04W 4/008* (2013.01); *H04W 4/023* (2013.01); *H04W 4/08* (2013.01); *H04W 8/183* (2013.01); *H04L 61/103* (2013.01); *H04L 61/3065* (2013.01); *H04L 61/6022* (2013.01); *H04L 61/6081* (2013.01)

(58) Field of Classification Search
  CPC .. H04L 61/3065; H04W 8/005; H04W 4/008; H04W 4/023; H04W 8/183; H04W 4/08; H04W 4/003
  USPC ................................ 455/41.2, 418–420, 566
  See application file for complete search history.

(56) References Cited

U.S. PATENT DOCUMENTS

| | | | |
|---|---|---|---|
| 2009/0061769 A1* | 3/2009 | Zimbric | H04M 1/7253 455/41.2 |
| 2009/0061946 A1* | 3/2009 | George | H04W 8/005 455/566 |
| 2010/0069115 A1* | 3/2010 | Liu | H04M 1/72569 455/556.1 |
| 2012/0011559 A1 | 1/2012 | Miettinen et al. | |
| 2012/0079019 A1 | 3/2012 | Miettinen et al. | |
| 2016/0057602 A1* | 2/2016 | Rayanki | H04W 8/005 370/254 |

OTHER PUBLICATIONS

U.S. Patent Application entitled Method to Automatically Infer User Signature Through Contextual Learning, filed Jun. 30, 2015.

* cited by examiner

Figure 7

METHOD TO AUTOMATICALLY INFER USER SIGNATURE THROUGH CONTEXTUAL LEARNING

CROSS-REFERENCE TO RELATED APPLICATIONS

This application is a continuation of co-pending U.S. patent application Ser. No. 14/788,334, filed Jun. 30, 2015. The aforementioned related patent application is herein incorporated by reference in its entirety.

BACKGROUND

Embodiments presented herein generally relate to techniques for enabling a first wireless computing device (e.g., a smartphone) to associate other wireless devices within a communication range to specific individuals or groups, and more specifically to techniques that allow the first wireless computing device to map a generic or non-descript identifier broadcast by other wireless devices to labels that can readily identify the user of the other wireless devices based on social event data on the first wireless device.

Wireless devices can be assigned an easy to understand name, such as "Emily's Phone." Such a name is often used to ease the process of establishing communication with other wireless devices. For example, Emily's friend can connect to the phone belonging to Emily by searching for "Emily's Phone" on their wireless device. A variety of applications allow users to share information, e.g., photos, videos, contact and calendar information, etc.

Although broadcasting an easily understandable name of a wireless device makes the wireless device user-friendly, doing so also leaks personal information, reducing the user's privacy. For example, broadcasting the name of a wireless device could allow a stranger to know a user's name or make it easier to identify the location of the user of the wireless device. Furthermore, the personal information broadcast by the wireless device can be combined with other personal information further increasing the vulnerability of the user to unwanted use of their personal information.

Users of wireless devices can give their devices less user-identifying names, such as "Phone 8732," but this additional security measure can make sharing information with others more challenging. For example, attempting to make a wireless connection to "Phone 8732" may be challenging in a crowded restaurant full of other wireless devices having similar names that do not identify the user.

SUMMARY

One embodiment presented herein discloses a method for determining a display label for a second wireless device. The method includes receiving, on a first wireless device, a first set of data including an identifier broadcast from the second wireless device in proximity to the first wireless device. The method further includes identifying a user in a set of event data available on the first wireless device wherein the first wireless device evaluates the set of event data and the identifier to correlate the identifier of the second wireless device with the user. Upon determining that the identifier from the second wireless device has an association with the user identified in the set of event data, the method further includes assigning a display label to represent the second wireless device on the first wireless device based on at least the set of event data available on the first wireless device.

DETAILED DESCRIPTION

Embodiments presented herein generally relate to techniques enabling a receiving wireless device (e.g., a mobile telephone, computing tablet, wearable computing device, etc.) to associate other wireless devices (also referred to as transmitting wireless devices) within a communication range of the receiving wireless device as belonging to specific individuals (or groups) recognized by the receiving wireless device. More specifically, embodiments presented herein provide techniques to enable a wireless device to use social event data on the receiving wireless device to translate anonymous information broadcast by other wireless devices to labels that can be understood by a user of the wireless device—typically labels which identify an owner of a device or an attribute of the owner (e.g., membership in a group).

In one embodiment, a receiving wireless device (e.g., a smart phone) receives anonymous IDs (e.g., a MAC Address) and generic display labels (e.g., "Phone 8732") from transmitting wireless devices. The receiving wireless device also extracts data from events, activities, or other actions recognized by the receiving wireless device, such as a calendar entry on the receiving wireless device or a social media posting. The receiving wireless device can correlate the extracted data from the events with the anonymous IDs and generic display labels and may allow the receiving wireless device to associate one of the transmitting wireless devices as being possessed by a specific individual (e.g., a contact from an address book) or a group (e.g., a group identified in a calendar entry). An anonymous ID broadcast by one of the other wireless devices generally includes information that can be used to identify the wireless device while not identifying the user of the wireless device, such as a MAC address, of a WiFi or Bluetooth® interface or IMEI number.

After observing the same anonymous ID broadcast by a transmitting wireless device during events, activities or other actions related to the same individual or group, the receiving wireless device can learn an association between the anonymous ID and the individual or group. This same individual or group can also be referred to as a user who is the individual or is a member of the group In one embodiment, the receiving wireless device stores information, such as locations and times when an anonymous ID of a transmitting wireless device appears and disappears and correlates this information data on the receiving wireless device related to, e.g., social events, activities, and other actions associated with the individual or group in order to achieve sufficient confidence that a given anonymous ID of a transmitting wireless device is associated with that individual or group. After achieving sufficient confidence, the receiving wireless device can associate a label identifying the individual or group (e.g., using the name of the individual or group) associated with the given anonymous ID of the transmitting wireless device. In one embodiment, the receiving wireless device presents a list of candidates (e.g., names of individuals) to associate a given anonymous ID of a transmitting wireless device with along with a measure of confidence in the association. Further, the receiving wireless device can prompt the user to confirm (or select) a transmitting wireless device identified by its anonymous ID is associated with the individual or group related to the event. Once assigned, the receiving wireless device can then display the label to the user of the receiving wireless device when the user attempts to connect to the transmitting wireless device having that anonymous ID.

Advantageously, users of the transmitting wireless device which connects with the receiving wireless device can continue to use a generic or non-descript device name without causing the user of the receiving wireless device to struggle through a list of generic display labels (e.g., "Phone 8732") when finding their device to make a connection. If two similarly enabled wireless devices broadcasting anonymous IDs and generic display labels can assign easily understandable display labels to the other's anonymous ID, the assigned display labels allow users to more-easily connect their wireless devices with each other to accomplish their intended communication, such as a Bluetooth® enabled photo share. Because both users are broadcasting generic device names instead of device names that leak personal information, such as "Emily's Phone," users maintain their privacy, while having access to user-friendly means of sharing information wirelessly.

Figure 1:
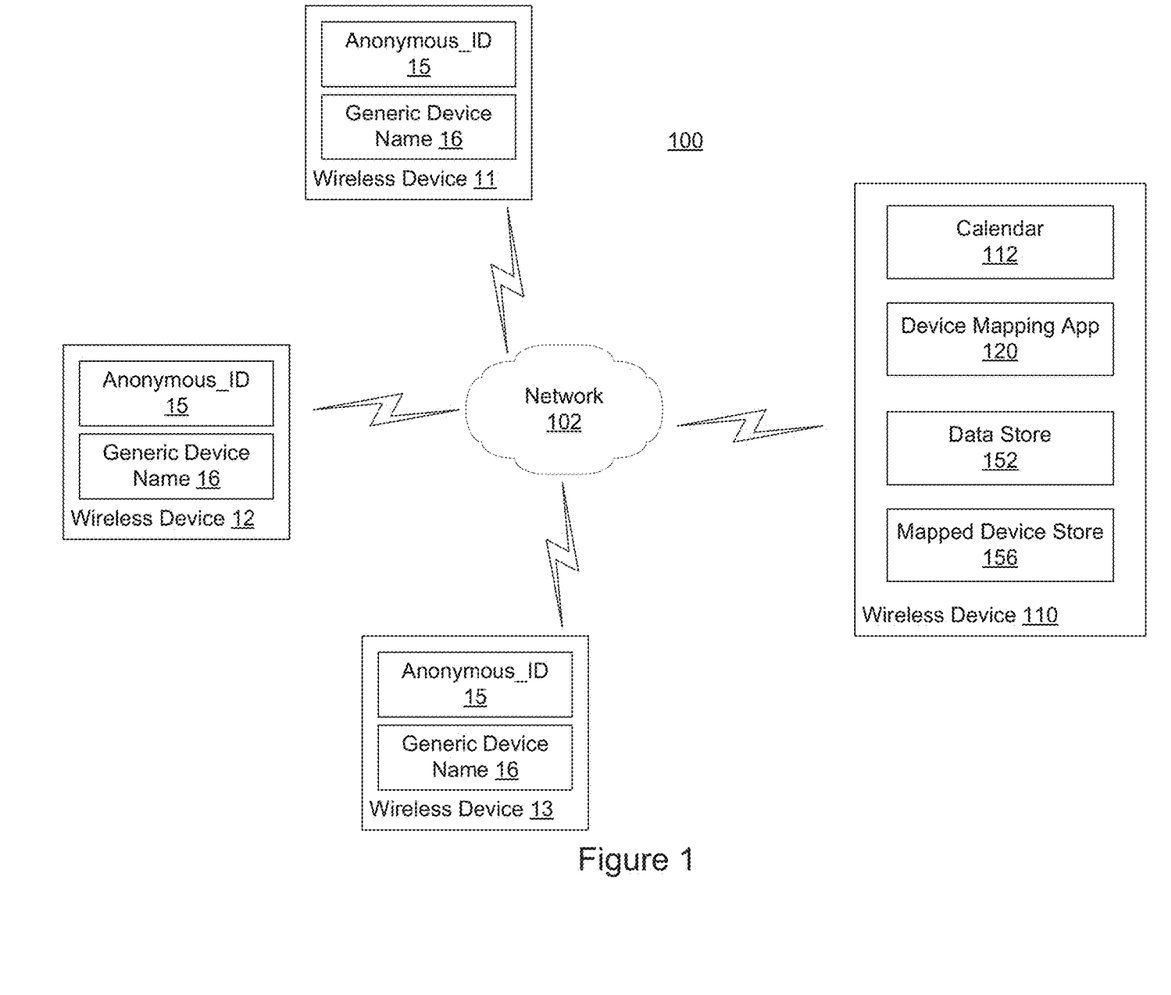
FIG. 1 illustrates an example communication environment for a wireless device, according to one embodiment.

FIG. 1 illustrates an example communication environment 100 for a wireless device 110, according to one embodiment. The communication environment 100 allows the wireless device 110 to exchange data with wireless devices 11-13 in proximity to the wireless device 110 over a wireless network 102, such as a Wi-Fi or Bluetooth® network. Wireless devices 11-13 are considered to be in proximity to the wireless device 110 when the wireless devices 11-13 are within of communication range of the wireless device 110 for a given network, such as a Bluetooth® network.

Each wireless device 11-13 includes a distinct anonymous ID 15 and a generic device name 16 used to identify the respective wireless device to others when establishing a connection with one another (e.g., a Bluetooth® connection). The anonymous ID 15 and the generic device name are broadcast by each wireless device 11-13. The anonymous ID 15 includes information used to identify wireless devices 11-13, while not identifying the user of the wireless device, such as a MAC address IMEI number, etc. The generic device name 16 (e.g., "Phone 8732.") does not identify a user, but in some cases the generic device name may not be unique, such as a generic device name of "Phone." Wireless device 110 can use anonymous ID 15 to communicate with the wireless device 110, such as when pairing the wireless device 110 with one of the wireless devices 11-13 for a Bluetooth® file share. To make such a paring, a user may select from a list of devices identified by a display label.

Although the anonymous IDs 15 and generic device name 16 may be used to establish a communication link between wireless device 110 and wireless devices 11-13, a user may find such a process challenging because it can be difficult remember an anonymous ID 15, such as a MAC address, or a generic device name 16, such as "Phone 8732," while scrolling through a list of devices for establishing a wireless connection. The process becomes even more challenging when the user of the wireless device 110 is in a crowded location with numerous other wireless devices broadcasting anonymous IDs, particularly where many devices broadcast the same generic device name 16, such as "Phone".

To address this problem, the wireless device 110 can use a device mapping application 120 (or 'app' for short) to associate certain anonymous IDs 15 with individuals or groups recognized by the wireless device 110. Once associated the device mapping application 120 can specify a display label that identifies an individual (or group) as being associated with the otherwise anonymous ID of a wireless device XXX. For example, the wireless device 110 can include applications containing social data, such as a calendar 112. The device mapping app 120 can extract data from the calendar 112, such as times and places for events, activities, and other actions (collectively referred to as events) and what individuals or groups are included in those events. The device mapping app 120 can place the extracted data in a data store 152 in the wireless device 110. The device mapping app 120 can also store anonymous IDs 15 and generic device names 16 of wireless devices (e.g., wireless device 11) observed by the wireless device 110 and correlate observations of specific wireless devices 11-13 with individuals (or groups) referenced in the event data. For example, if a wireless device with a generic device name is observed near the time a calendar reminder has been scheduled, and if such a reminder identifies an individual (e.g., "pick up Sara from work"), the wireless device can identify the observed wireless device as being a candidate for belonging to that individual ("Sara" in this example). Over time, if multiple observations of that wireless device can be correlated with the individual, the wireless device 110 creates a mapping between that wireless device and the individual (or group) referenced in the related social or event data on the wireless device. Once mapped, the wireless device 110 can replace the generic display label (e.g., "Phone 8732") with an assigned display label (e.g., "Emily's Phone").

After the wireless device 110 observes the same anonymous ID 15 during multiple events associated with a particular individual or group, the device mapping app 120 may be able to establish sufficient confidence that this same anonymous ID 15 is related to the particular individual or group. Once established, the device mapping app 120 can assign a display label (e.g., "Emily's Phone") to identify this anonymous ID 15, such as the name of the individual or group included in the events during which the wireless device 110 encountered the same anonymous ID 15. The device mapping app 120 can save a mapping of the assigned display label to the anonymous ID 15 and generic device name 16 in a mapped device store 156. The device mapping app 120 enables the assigned display label (e.g., Emily's Phone) to be displayed to the user of the wireless device 110 instead of the anonymous ID 15 or the generic device name. For example, an assigned display label for an individual could be "Emily's Phone," and an assigned display label for a group could be "Soccer Parents." Because the assigned display label describes a user of the wireless device transmitting the anonymous ID 15, the assigned display label is easy to understand for the user of the wireless device 110 and establishing a connection to a wireless device (e.g., wireless device 11) having an anonymous ID 15 mapped to an assigned display label is made easier by use of the label. Of course, a user could edit a mapped label or mapping as well.

Figure 2:
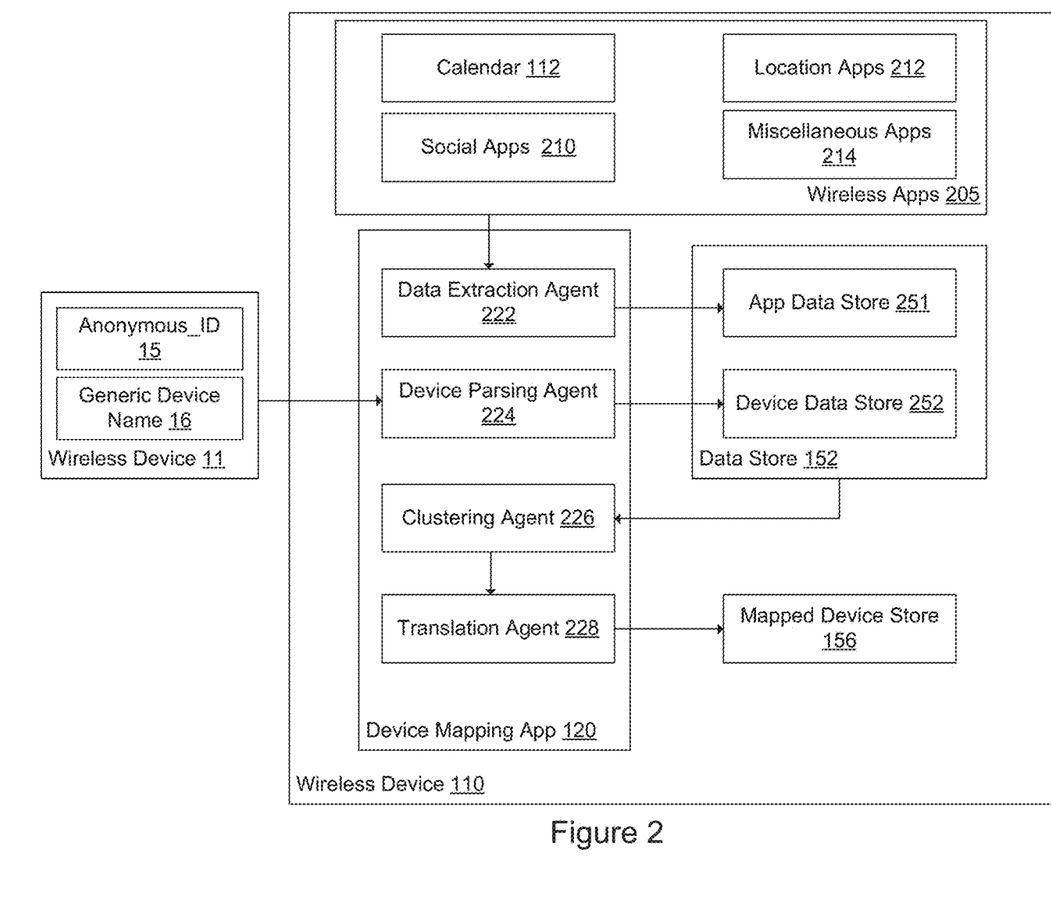
FIG. 2 is a block diagram illustrating the execution of a device mapping application on the wireless device of FIG. 1, according to one embodiment.

FIG. 2 is a block diagram illustrating the device mapping app 120 on the wireless device 110, according to one embodiment. As described above, the device mapping app 120 can extract data from apps, such as the calendar 112, and correlate that data with information received from wireless devices, such as an anonymous ID 15 and generic device name 16 from wireless device 11, to learn the individual or groups associated with different wireless devices. The device mapping app 120 can use a device parsing agent 224 to store the anonymous IDs 15 and generic device names 16 that the wireless device 110 encounters, for example in a device data store 252.

In addition to the calendar 112, the device mapping app 120 can also extract data from other apps on the wireless device 110, such as social apps 210, location apps 212, and a variety of miscellaneous apps 214. These other apps and the calendar 112 are collectively referred to as wireless device apps 205. The device mapping app 120 uses a device extracting agent 222 to first extract data from the wireless device apps 205 and then place the extracted data in an app data store 251. The app data store 251 and the device data store 252 may be stored together in the data store 152.

The social apps 210 generally represent apps which exchange information with others devices and/or other people besides the user of the wireless device 110. For example, the social apps 210 may include one or more email apps, social media apps, and a text message apps. The social apps 210 can provide data to the device mapping app 120 indicating that an event related to an individual or group recognized by the wireless device 110 is presently occurring, has recently occurred, or is about to occur. The wireless device 110 recognizes individuals and groups through the calendar and social apps from sources, such as a list of contacts in an email account, social media account, or from extracting names from the text in these apps, such as text in a calendar entry for a name that is not included in any contact list on the wireless device 110. Information related to an event may be as simple as the user of the wireless device 110 is in a physical location around another individual recognized by the wireless device 110. For example, a text message from an individual (e.g., someone in a mobile phone's list of contacts) to the wireless device 110 stating "I'm here" can allow the device mapping app 120 to correlate the anonymous IDs 15 and generic device names 16 that are presently observed by the wireless device 110 with the individual who stated "I'm here." Further examples of events are provided below in reference to FIG. 3.

The location apps 212 include any app that can identify the location of the wireless device 110, such as a GPS or cellular-based location app. In one embodiment, the device mapping app 120 can compare information from the location apps 212 to a location available from one of the calendar 112 or social apps 210. For example, if a calendar entry includes an address for where a meeting is planned, then the device mapping app 120 can place greater value on the anonymous IDs 15 and generic device names 16 of wireless devices received at the location of the address during times around the calendar entry than anonymous IDs 15 and generic device names 16 of wireless devices received at other locations.

The miscellaneous apps 214 can include apps that can capture additional data from the events extracted from the calendar 112 and social apps 210. The additional data from the miscellaneous apps 214 could include audio data (e.g., from a microphone), visual data (e.g., from a camera) or data from one or more sensors (e.g., a temperature sensor) included in the wireless device 110. In one embodiment, the miscellaneous apps 214 include a voice recognition app that can distinguish between different individuals from their voices. By interacting with a voice recognition app, the device mapping app 120 could determine that a voice of a same individual is present during multiple meetings or other activities with a particular individual or group as indicated by the events extracted from the calendar 112 and the social apps 210. For example, the device mapping app 120 can associate a particular voice with a particular anonymous ID 15 by comparing the times when the particular anonymous ID 15 arrives and leaves with times when recordings of the particular voice starts and ends. If a link can be made between a voice and an individual recognized by the wireless device 110, then this link can be extended to the anonymous ID 15, which has already been linked to the voice as described above. For example, the voice recognition software may be able to extract the name of a speaker from a conversation that the voice recognition software is analyzing. Other embodiments may use a facial recognition app to assist in distinguishing between individuals. In another embodiment, the device mapping app 120 could realize greater confidence that an event has started based on measurements from one or more sensors. For example, the device mapping app 120 can gain greater confidence that a business meeting has started when motion of the wireless device is reduced as indicated by measurements from an accelerometer. As another example, the device mapping app 120, may gain greater confidence that a pool party has started by noting an increased temperature for an extended period of time. Overall, the miscellaneous apps 214 can give the device mapping app 120 greater confidence that an event as indicated by the calendar or social apps is presently occurring, which enhances the ability of the device mapping app 120 to learn the individuals or groups who are associated with particular anonymous IDs 15 and generic device names 16.

The device mapping app 120 also includes a clustering agent 226 that forms a collection of the data (e.g., portions of the app data store 251 and the device data store 252) associated with the different individuals and groups recognized by the wireless device 110. For example, the clustering agent 226 can form a collection from the data associated with an individual named Emily across any events associated with Emily (as determined from the calendar 112 and the social apps 210). In one example, event data associated with Emily could include two calendar entries and three social media posts. In this example, the data collected by the clustering agent 226 for Emily (Emily's Data) would include the anonymous IDs 15 and generic device names 16 that were observed by the wireless device 110 during the times around these five events. Emily's Data could also include data from the location apps 212 and the miscellaneous apps 214. As described above, the data from the location apps 212 and the miscellaneous apps 214 can be used to increase the confidence for determining when the event extracted from the calendar 112 or social apps 210 is occurring. The clustering agent 226 can use the data from the location apps 212 and the miscellaneous apps 214 to improve the accuracy of conclusions about when an event started and ended enabling the clustering agent 226 to disregard anonymous IDs 15 received outside of the time window of the event. In some embodiments, the device mapping app 120 may use a variety of well-known machine learning techniques, such as clustering or Bayesian learning in determining whether to associate an anonymous ID 15 and generic device name 16 with an individual or group recognized by the wireless device 110.

In some embodiments, it may be beneficial to analyze data collected just before and/or just after the concluded start and end times of an event extracted from the calendar 112 or social apps 210. For example, a social media post, such as a time-stamped picture that identifies the people in the picture with a tag that can be recognized by the wireless device 110 can be a rather short event. For example, the device mapping app 120 could treat such an event as 30 second event or a 1 minute event based off of the timestamp of the picture. In such instances, it may be beneficial to also analyze the anonymous IDs 15 and corresponding generic device names 16 for a period of time before the post and a period of time after the post. In some embodiments, the anonymous IDs 15 and corresponding generic device names 16 collected shortly before and shortly after the event can be given a lower weighting factor than anonymous IDs 15 and corresponding generic device names 16 collected during the event. Furthermore, in cases where an event has a defined ending time (e.g., a meeting), tracking the times when different anonymous IDs are last observed can further assist the wireless define refine the mappings of the other wireless devices to their anonymous IDs. For example, if the user of the wireless device 110 has a meeting that ends at noon, then the wireless device 110 can refine the mappings of the other wireless devices by observing which devices are last observed around noon.

As the clustering agent 226 continues to receive event data for individuals or groups and observations of anonymous IDs 15 and generic device names 16, the device mapping app 120 can determine a confidence level that a particular anonymous ID 15 and corresponding generic device name 16 is associated with an individual or group. In some embodiments, the determined confidence level and the minimum confidence may both be less than 100%.

Once the confidence in an association exceeds a threshold, a translation agent 228 can map this particular anonymous ID 15 and corresponding generic device names 16 to the particular individual or group. In some embodiments, feedback from the user of the wireless device 110 can be used to adjust the threshold for completing a mapping or prompting the user of the wireless device 110 to approve the mapping. The confidence threshold value would likely have to be tuned in practice, and may vary between different devices or users. Many classification algorithms have a confidence level that is outputted during the computation. This outputted confidence level can be used to compare against a threshold. The threshold can be something that is compared against over time (e.g., against many cumulative events) or it could even be compared against on a per-event basis. For the latter, the algorithm may have a very high confidence that a single event, such as a meeting, was sufficient to make the mapping. Then the algorithm could immediately make the mapping recommendation even though the sample size is small. The threshold value could also be dynamically determined based on the false positive and false negative rates. This dynamic determination could either be done (i) per-user by adapting the threshold value as the user gives feedback to the system about whether the mappings are right or wrong or (ii) in a big-data/cloud-based environment, where the threshold values are changed based on mapping success/failure rates over the entirety of the system (e.g., every user would upload mapping information to a centralized cloud that can than adjust the threshold).

Thereafter, anytime that wireless device is observed, the mapped display label determined by the translation agent 228 may be shown in lieu of the generic device label corresponding to the generic device name. The mapped display label can be saved in the mapped device store 156 along with the corresponding anonymous ID 15 and generic device name 16. For example, a generic device name "Phone 8732" along with a corresponding anonymous ID 15 (e.g., a MAC Address) could be mapped to the individual Emily using the label "Emily's Phone." Similarly, a generic device name "Phone 9723" and corresponding anonymous ID could be mapped to a group for parents of a soccer team using the label Soccer Parents. In some embodiments, the device mapping app 120 can prompt a user to confirm whether to map an anonymous ID 15 to a particular individual or group. The prompt may also show confidence level to assist the user in deciding whether to accept the mapping. If the user approves, then the anonymous ID 15 and corresponding generic device name are mapped to the easily understood display label. Thereafter, the newly mapped label is used as a display label anytime the presence of the device with that anonymous ID 15 is presented to the user of the wireless device. The user can modify the label as desired. If the user rejects the suggested mapping, then the device mapping app 120 continues to present the generic device label whenever that device is observed. In one embodiment, a message is sent to the transmitting wireless device that the wireless device 110 is attempting to map to a display label, and the user of the transmitting wireless device may also be able to approve or reject the mapping.

Because groups include more than one individual, the process of collecting data can continue for the groups, and each anonymous ID 15 and corresponding generic device name 16 for which the device mapping app 120 gains sufficient confidence can be mapped to the group. Furthermore, groups can gain new members over time, so the device mapping app 120 continues to collect data for the events associated with the groups. In a similar light, individuals can replace their devices or have more than one device that is broadcasting an anonymous ID 15, so the so the device mapping app 120 continues to collect data for the events associated with individuals even after a device (e.g., Emily's Phone) has been mapped to that individual. Moreover individuals or group members may change the name of their device (e.g., the generic device name 16), but the anonymous ID 15 (e.g., a MAC Address) will stay the same and the mapping between the assigned display label and the anonymous ID 15 may be maintained. Furthermore, the display labels may also change over time, for example "Mr. Bob Evans" could become "Dr. Bob Evans". In some embodiments, the change of the display label can be initiated by the user of the wireless device 110.

After a wireless device broadcasting an anonymous ID 15 and generic device name 16 has been mapped to a label saved in the mapped device store 156, the device mapping app 120 can use the translation agent 228 to display the label (e.g., "Emily's Phone") to the user of the wireless device 110 instead of the anonymous ID 15 (e.g., MAC Address) or generic device name (e.g., "Phone 8732") when the device having the mapped anonymous ID 15 and corresponding generic device name 16 is within a communication range of the wireless device 110. Displaying the mapped label to the user of the wireless device 110 makes it easier for the user to connect to the device corresponding to the label because the label (e.g., Emily's Phone) is easier to understand and remember than the generic device name (e.g., "Phone 8732") or anonymous ID 15 (e.g., MAC Address). Furthermore, the user of the other device (e.g., Emily's Phone) can continue to broadcast the generic device name 16 (e.g., "Phone 8732"), which helps the user of the other device maintain privacy.

Although FIGS. 1 and 2 show the applications as being part of the wireless device 110, in some embodiments one or more of the applications, such as one or more of the wireless device apps 205 or device mapping app 120 may be a browser-based application or a cloud-based application. Furthermore, in some embodiments at least some of the data stored in the data store 152 may be stored in a cloud environment. In some cloud-based embodiments, the wireless device 110 mainly transfers data between the other wireless devices and the cloud-based applications, and the actual mapping of the other wireless devices to the wireless device 110 can be completed by the cloud-based application. In some embodiments, the other wireless devices can independently communicate to the cloud-based application and mappings from the wireless device 110 to these other wireless devices can be completed without communication between the wireless device 110 and these other devices. For example, the wireless device 110 would not be required to observe the anonymous IDs 15 (e.g., MAC address) of these other wireless devices because the cloud-based application may be able to observe these anonymous IDs 15 independently from the wireless device 110. The cloud-based application may then extract data from apps accessible on the wireless device 110, such as the calendar 112, which may also be a cloud-based application, to determine what individuals or groups the user of the wireless device 110 is interacting with at that time. In such embodiments, it is even possible to complete a mapping for another wireless device to the wireless device 110 when the wireless device 110 is off. For example, the cloud-based device mapping application may receive anonymous IDs 15 and location information from wireless devices other than the wireless device 110, and the cloud based application can determine that the user of the wireless device 110 from a cloud based application, such as a calendar entry identifying a location for a meeting between the user of the wireless device 110 and other individuals or a group.

A cloud-based application may also help refine the confidence levels that strike the best balance between accurate identification of wireless devices broadcasting anonymous IDs and speed of mapping the anonymous IDs of these wireless devices to easily understood display labels on a wireless device, such as the wireless device 110. For example, by using a cloud-based application, a database can be formed to enable the data for numerous users to be analyzed instead of limiting the pool of data to one user, such as the user of the wireless device 110. The feedback from numerous users stored in the cloud environment can enhance the experience for all users of a cloud-based device mapping application by improving the balance between the accuracy and speed of the mapping of wireless devices broadcasting an anonymous ID 15 to a display label (e.g., Emily's Phone) for a given wireless device, such as the wireless device 110. Furthermore, the cloud-based data from numerous users can improve the experience for new users who would otherwise start with no data when they begin to use a device mapping application, such as the device mapping application 120.

Figure 3:
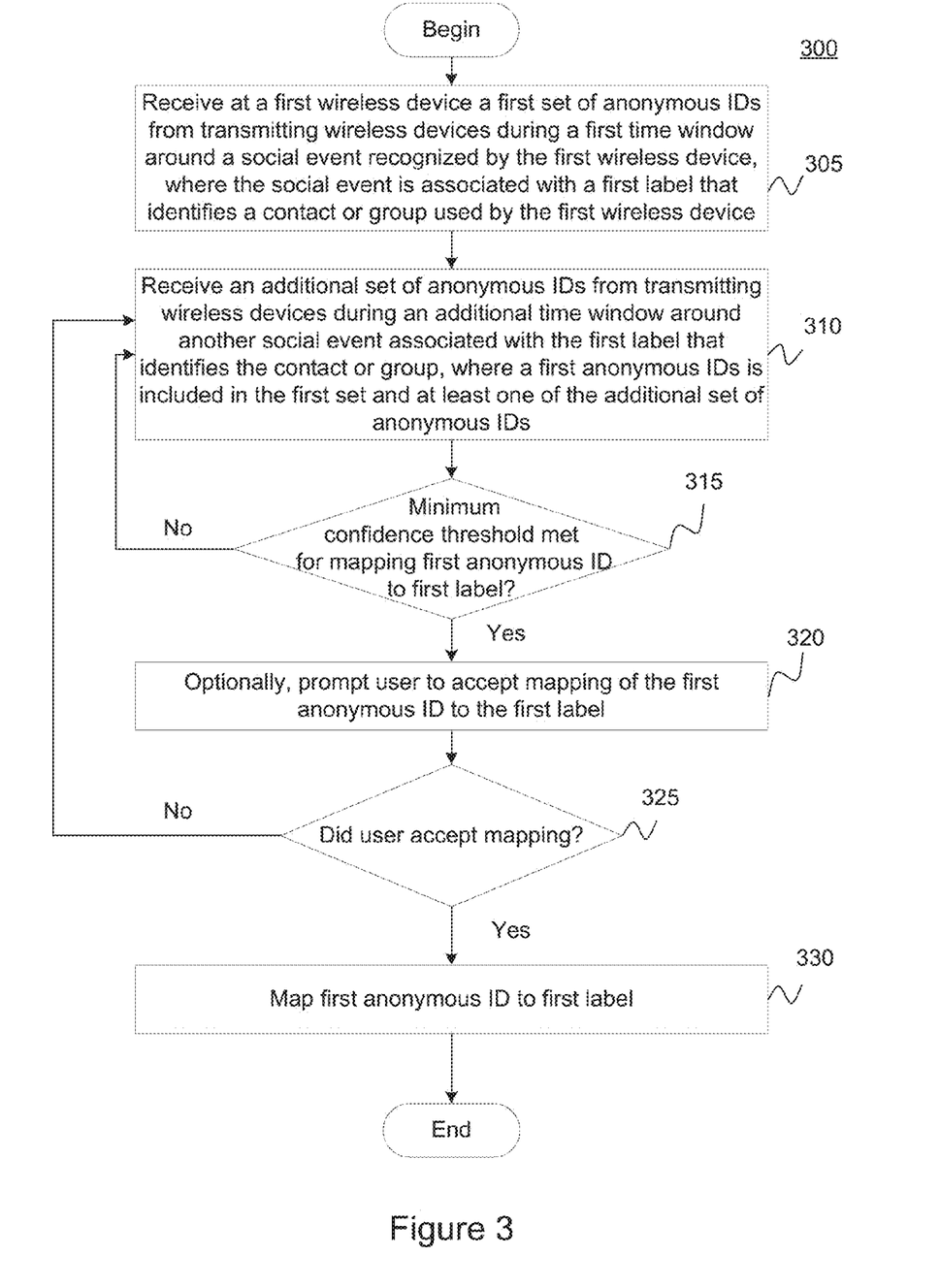
FIG. 3 illustrates a method executed on a receiving wireless device for mapping a nearby wireless device broadcasting an anonymous ID to a label corresponding to an individual or group recognized by the receiving wireless device, according to one embodiment.

FIG. 3 illustrates a method 300 for assigning a display label to a wireless device broadcasting a generic device name and anonymous ID, according to one embodiment. As shown, the method 300 begins at step 305, where the wireless device 110 observes a first set of anonymous IDs 15 and generic device names 16 from transmitting wireless devices during a time window around a first event recognized by the wireless device 110. As noted, event data stored on the wireless device 110 may identify individuals or groups (also referred to as a user) associated with the event. The wireless device 110 can determine when the first event occurs by extracting data from applications on the wireless device 110, such as the calendar 112 or the social apps 210 to determine when an event occurs. The first event is associated with the user of the wireless device 110 and an individual or group recognized by the wireless device 110, for example, a meeting between the user of the wireless device 110 and the individual or group recognized by the wireless device 110. As one example example, the first event could be a calendar entry including a meeting with an individual named Emily, and the first set of anonymous IDs 15 and generic device names could be the anonymous IDs of five wireless devices observed by the wireless device 110 during a time window indicated by the calendar entry. In one embodiment, the time window could include a period of time between a start time and an end time for an event, such as calendar entry. In another embodiment, the time window includes a period of time before and a period of time after a time indicated by an event, such as a calendar entry with only a start time or a social media posting with only the time of the posting.

At step 310, the wireless device 110 receives an additional set of anonymous IDs 15 and generic device names 16 from transmitting wireless devices during a time window around an additional event associated with the same individual or group associated with the first event of step 305. The wireless device 110 can determine when the additional event occurs by extracting data from one or more applications on the wireless device 110, such as the calendar 112 or the social apps 210. The additional event is associated with the user of the wireless device 110 and an individual or group recognized by the wireless device 110, for example, a meeting between the user of the wireless device 110 and the individual or group recognized by the wireless device 110.

As stated above, the first event and the second additional event are associated with a same individual or group. For example, if the first event was associated with the individual named Emily, then the additional event corresponding to the data received during step 310 is also associated with the individual named Emily. The additional event in step 310 can be a different type of event than the first event in step 305. For example, the first event can be a calendar entry while the second event could be something different, such as a social media posting or a text message.

At step 315, the device mapping app 120 determines if a minimum confidence is met for mapping an anonymous ID 15 and corresponding generic device name 16 to a display label corresponding to the individual or group associated with the event data from step 305 and step 310. The device mapping app 120 may check if at least one of the anonymous IDs 15 observed by the wireless device 110 during step 305 matches one of the anonymous IDs 15 observed by the wireless device 110 during step 305. Over time, a set of candidate wireless devices may decreased to a single wireless device as confidence increases for a given transmitting wireless device being associated with a particular individual or group recognized by the wireless device 110. When sufficient confidence is obtained, the translating agent 228 may assign a display label to the transmitting wireless device. The user of the wireless device 110 can also observe the list of candidates before the minimum confidence is met and manually complete the mapping a given transmitting device to a display label (e.g., Emily's Phone).

In some instances one event may be sufficient to build enough confidence that an anonymous ID 15 and corresponding generic device name 16 is associated with a particular individual or group. For example, if a calendar entry is to pick up Emily at a specific time, and only one anonymous ID 15 and corresponding generic device name 16 is observed by the wireless device 110 around the time of that calendar entry, then sufficient confidence may be obtained from this one event to map the anonymous ID 15 and corresponding generic device name 16 to the individual named Emily. In such embodiments, step 315 can occur before step 310, and in such embodiments the step 305 can be considered part of the same loop formed by steps 310 and 315 illustrated in FIG. 3.

If the device mapping app 120 determines at step 315 that the minimum confidence is not met, then the method 300 returns to step 310 to collect additional data during additional events associated with same individual or group that was associated with the first event of step 305. If the device mapping app 120 determines at step 315 that there is sufficient confidence, then the generic display label (e.g., "Phone 8732") associated with that anonymous ID is replaced with a label based on the individual identified in the event data (e.g., Emily's Phone).

At step 320, after the minimum confidence is met, the user of the wireless device 110 can optionally be prompted to approve the new display label to use when the presence of the wireless device corresponding to the anonymous ID is observed. In some embodiments, the prompt displays a % confidence to the user (e.g., "With 95% confidence, Phone 8732 is Emily's Phone"). Furthermore, in some embodiments, the user has the opportunity to modify the label.

At step 325, the method 300 either continues with the mapping or returns to collect additional data based on whether the user accepted the mapping in the prompt displayed in step 320. Because step 320 is optional, step 325 is only executed if step 320 is executed. If the user rejects the mapping suggested in the prompt of step 320, then the method 300 returns to step 310 to collect additional data during additional events associated with same individual or group that was associated with the first event of step 305. If the user approves the mapping suggested in the prompt of step 320, then the method 300 continues in step 330.

At step 330, the label based on the event data (e.g., Emily's Phone) is mapped to the device having the anonymous ID 15 and generic device name 16 for which the minimum confidence was met in step 320. The method 300 is used to display a sequence for the completion of mapping one anonymous ID 15 and corresponding generic device name 16 to one individual or group recognized by the wireless device 110. However, as described above the data collection for each individual or group continues because groups include more than one member, the generic device names of the transmitting wireless devices may change, and the devices belonging to individuals and members of groups change over time, and these other devices may also broadcast anonymous IDs that can be mapped by the method 300.

Figure 4:
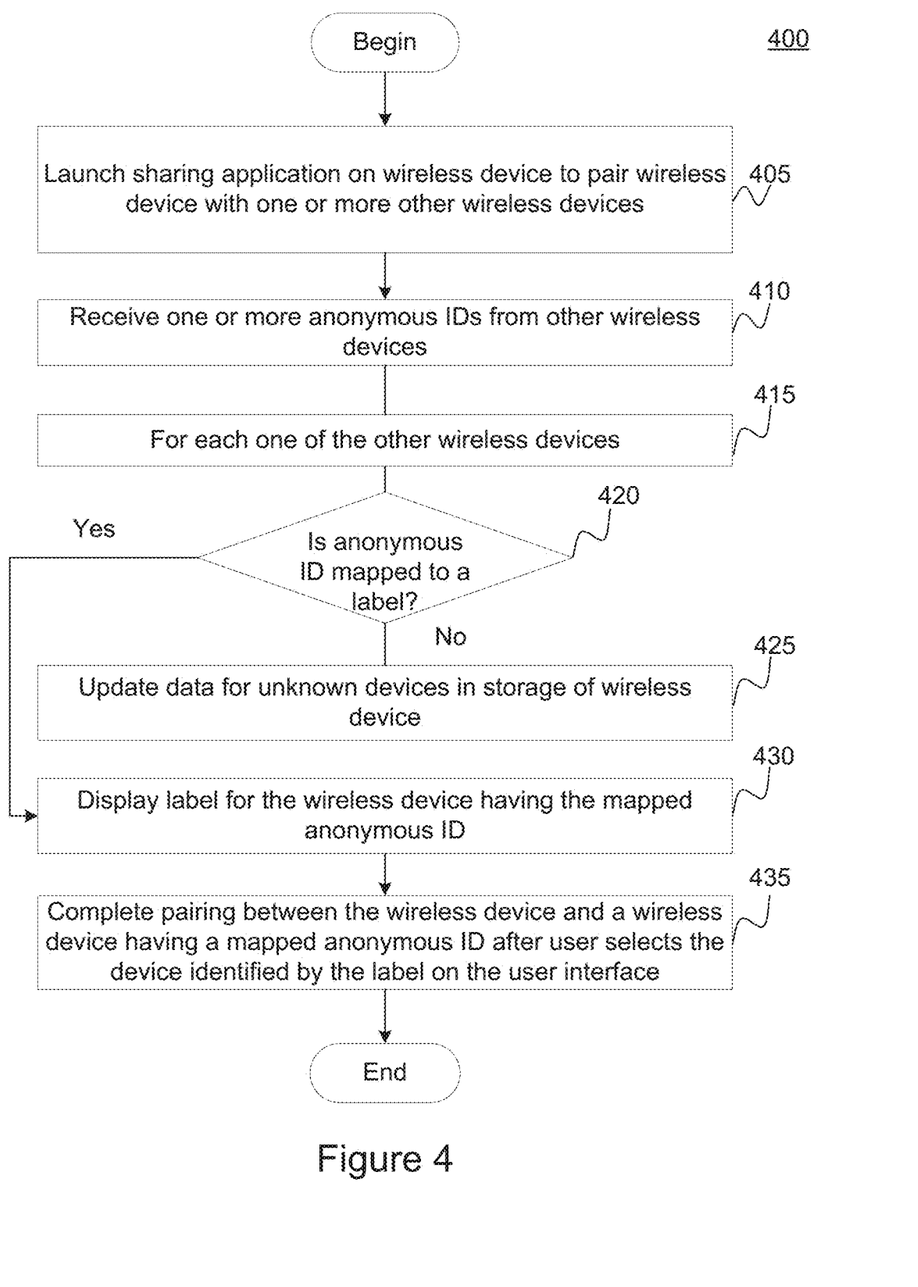
FIG. 4 illustrates a method for displaying wireless device labels that have been mapped by a receiving wireless device, according to one embodiment.

FIG. 4 illustrates a method 400 for displaying wireless device labels that have been mapped by the wireless device 110 of FIGS. 1 and 2 and the method 300 of FIG. 3, according to one embodiment. At step 405, a sharing app is launched on the wireless device 110 to pair the wireless device 110 with one or more other wireless devices. The sharing app can be an app to share a file, such as a photo.

At step 410, the wireless device 110 receives one or more anonymous IDs 15 and generic device names 16 from one or more other wireless devices.

After step 410, steps 415 to 430 are executed in a loop for each wireless device having an anonymous ID received during step 410. At step 420, the wireless device 110 evaluates one of the anonymous IDs 15 received during step 410 to determine whether that device has been mapped to a label. In some embodiments, the generic device name 16 may also be evaluated. If a particular anonymous ID 15 and corresponding generic device name 16 has not been mapped to a label, then the anonymous ID 15 and corresponding generic device name 16 for that device is included with other data being stored for any event that may be occurring at that time as indicated from the calendar 112 or social apps 210. Before a particular wireless device is mapped, a generic device label (e.g., "Phone 8732") corresponding to the generic device name 16 broadcast by the wireless device is displayed to the user of the wireless device 110. On the other hand, if a particular anonymous ID 15 has been mapped to a label, then the wireless device 110 can display the mapped label to the user at step 430. In some embodiments, the pairing of wireless device 110 with a wireless device that has been mapped to a label (e.g., Emily's Phone) can also be treated as an event for which additional data is stored.

When the loop including steps 415 to 430 is finished for each wireless device having an anonymous ID 15 received during step 410, then the wireless device 110 can display to the user a list of all of the labels (e.g., Emily's Phone) corresponding to devices having an anonymous ID 15 which has been mapped to a label as well as a generic display label for other wireless devices. The mapping of these devices simplifies the process for pairing the wireless device 110 to one of the mapped wireless devices relative to using generic device label (e.g., Phone 8732) for pairing. At step 435, the user of the wireless device 110 selects a wireless device identified by a label that has been mapped to one of the anonymous IDs received during step 410. The user of the wireless device 110 may also be able to select an unmapped wireless device by selecting a generic device label. The wireless device 110 and the selected wireless device can then complete the pairing process in a typical fashion.

Figure 5:
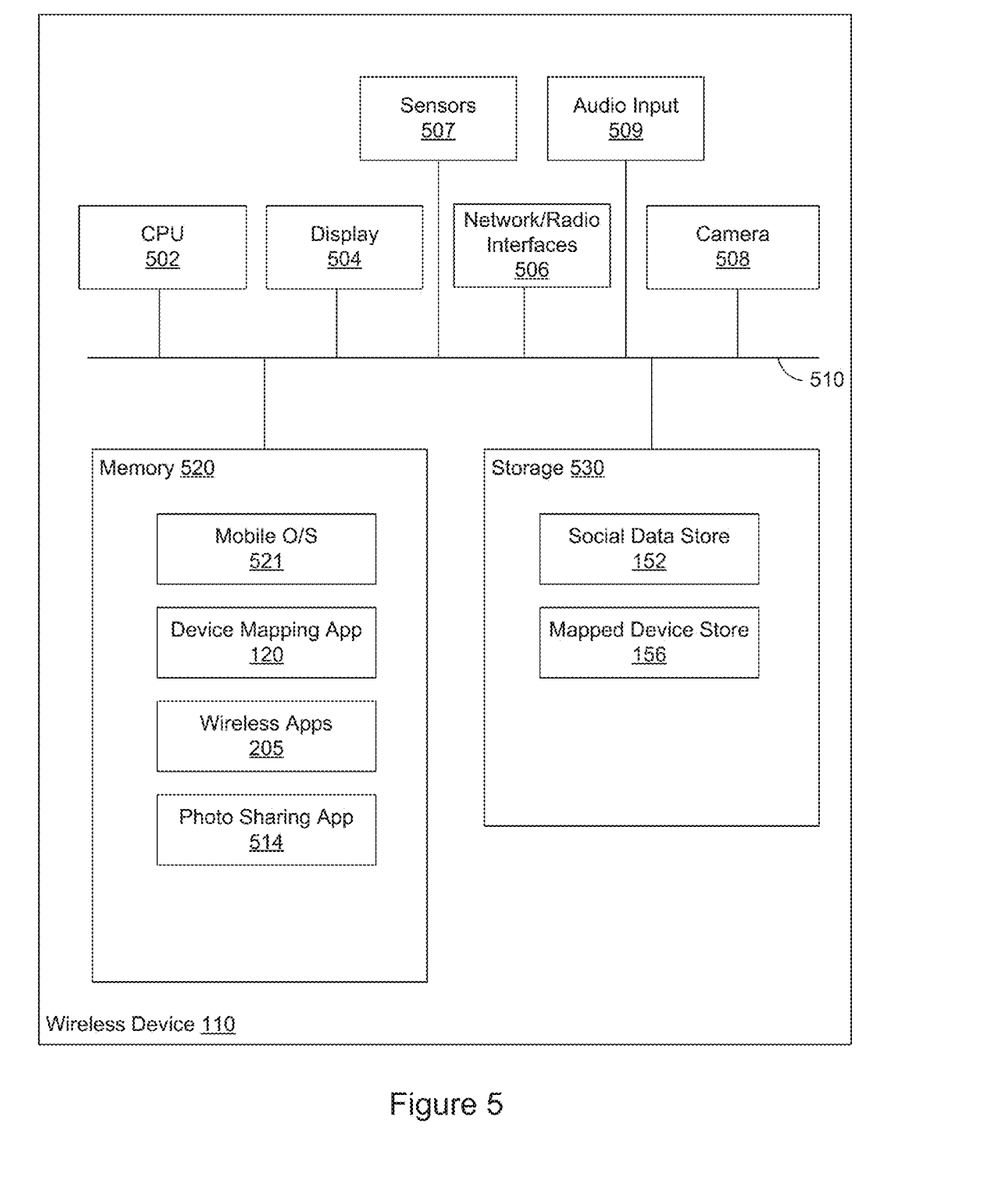
FIG. 5 illustrates an example wireless device that may be used to execute a device mapping application, according to one embodiment.

FIG. 5 illustrates an example of a wireless device 110, according to one embodiment. As shown, the wireless device 110 includes, without limitation, a central processing unit and graphics processing unit (CPU/GPU) 502, a display 504, network/radio interfaces 506, one or more sensors 507 (e.g., a temperature sensor), a camera 508, an audio input 509, an interconnect 510, a memory 520, and storage 530. Of course, an actual wireless device such as a wireless phone, will include a variety of additional hardware components.

The CPU/GPU 502 retrieves and executes applications, such as the device mapping app 120 and the wireless device apps 205, stored in the memory 520. Similarly, the CPU/GPU 502 stores and retrieves application data residing in the storage 530. The interconnect 510 is used to transmit instructions and data between the CPU/GPU 502, storage 530, network/radio interfaces 506, and memory 520 as well as the other hardware components, such as the display 504.

The CPU/GPU 502 is included to be representative of a single CPU, multiple CPUs, a single CPU having multiple processing cores, and the like. And the memory 520 and storage 530 are generally representative of memory and storage on a wireless device, e.g., DDR and flash memory spaces.

Illustratively, the memory 520 includes a mobile operating system (O/S) 521, the device mapping app 120, and the wireless device apps 205 including the calendar 112, social apps 210, location apps 212, and miscellaneous apps 214. The mobile O/S 521 provides software configured to control the execution of the application programs on the wireless device 110. The device mapping app 120 generally provides a software application configured to associate wireless devices within a communication range of the wireless device 110 as belonging to specific individuals or groups recognized by the wireless device 110. The device mapping app 120 can translate anonymous IDs 15 and generic device names 16 broadcast by wireless devices to labels (e.g., Emily's Phone) that can be easily understood by a user of the wireless device 110. The device mapping app 120 can store the extracted data and anonymous IDs in the data store 152. The device mapping app 120 can determine that an anonymous ID is associated with a specific individual or group by correlating the anonymous IDs and data extracted from the calendar 112 and the social apps 210 during times around events associated with the individual or group. Data extracted from the location apps 212 and miscellaneous apps 214 can further assist the device mapping app 120 in determining that a particular anonymous ID is associated with a particular individual or group. Device mapping app 120 can store the mapping of anonymous IDs and generic device names to corresponding labels in the mapped device store 156. In some embodiments, the device mapping app 120 can continuously run in the background in order to continue collecting data that can be used to assign labels to anonymous IDs and generic device names broadcast by wireless devices associated with individuals or groups recognized by the wireless device 110.

After an anonymous ID and corresponding generic device name for a given wireless device is mapped to a label (e.g., Emily's Phone), the device mapping app 120 can be used to show the assigned label of the given wireless device on the display 504 instead of the anonymous ID when the user of the wireless device 110 attempts to pair the wireless device 110 with another device and the given wireless device is broadcasting its anonymous ID within the communication range of the wireless device 110. This process may occur when the user of the wireless device 110 launches a sharing app, such as a photo sharing app 514.

Figure 6A:
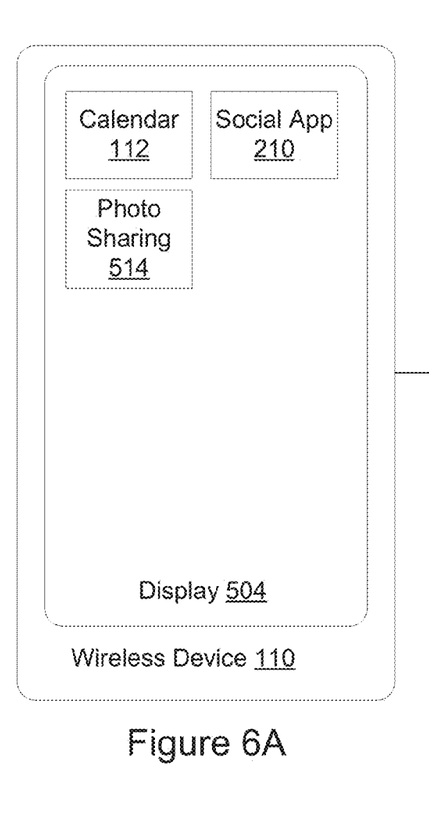
FIGS. 6A to 6C illustrate an exemplary photo sharing application which identifies available devices using a mapping application, according to one embodiment.
Figure 6B:
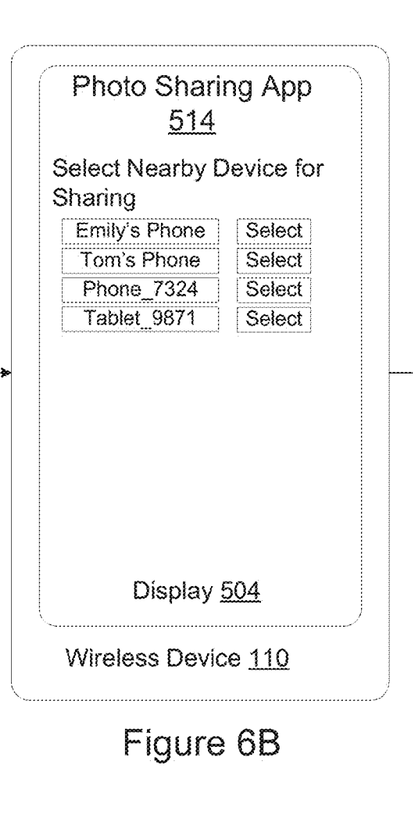
Figure 6C:
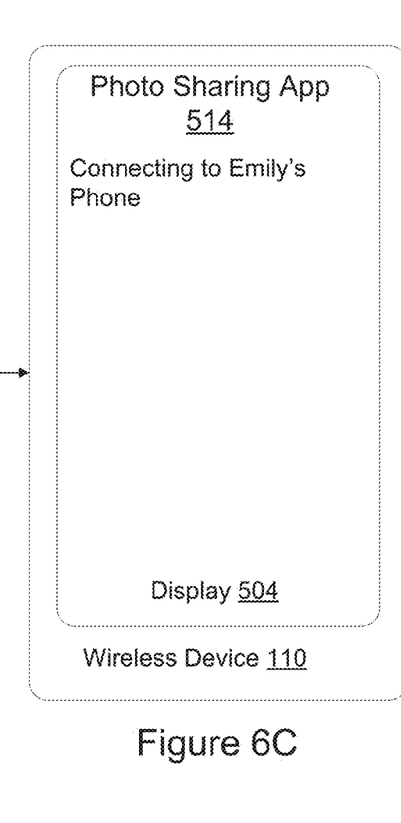

FIGS. 6A through 6C illustrates an example of a photo sharing app presenting mapped device labels as part of a photo sharing process, according to one embodiment. In FIG. 6A, the user of the wireless device 110 launches the photo sharing app 514 by selecting a corresponding button on the display 504. In FIG. 6B, the user of the wireless device 110 can select the device to connect with for sharing digital images. In this example, the wireless device 110 receives anonymous IDs (e.g., a MAC Address) and corresponding generic device names (e.g., Phone 8742") from four devices. The device mapping app 120 has a mapped label (i.e., Emily's Phone and Tom's Phone) to two of these anonymous IDs and corresponding generic device names. For the other two devices, the generic device labels (i.e., Phone 7324 and Tablet 9871) corresponding to the generic device names are displayed. In some embodiments, the assigned labels are displayed above the generic device labels because there is a higher likelihood that the user of the wireless device 110 will pair to a device having an assigned label for its anonymous ID relative to a device not having an assigned label for its anonymous ID. In other embodiments, the generic device label (e.g., Phone 7324) may be included with the mapped display label (e.g., Emily's Phone). FIG. 6C shows the result when the user of the wireless device 110 selects Emily's Phone as the device to share one or more photos. As illustrated by FIGS. 6A 6C, the process of pairing the wireless device 110 to Emily's Phone simplified by the assigned label (i.e., Emily's Phone) mapped to the anonymous ID of Emily's Phone. Under situations where wireless device 110 is receiving many more than four anonymous IDs, such as in a crowded restaurant, the benefits gained by mapping an anonymous ID of an individual or group member's device to an easy to understand label are even greater because the difficulty of finding a generic device label (e.g., Phone 8732) increases as the number of devices in the list including the anonymous ID increases. Furthermore, the individual or group member having the device with the anonymous ID and corresponding generic device name mapped to a label in the wireless device 110 can maintain their privacy by continuing to broadcast an anonymous ID and generic device name while still being able to complete a user-friendly pairing process with the wireless device 110.

Figure 7:
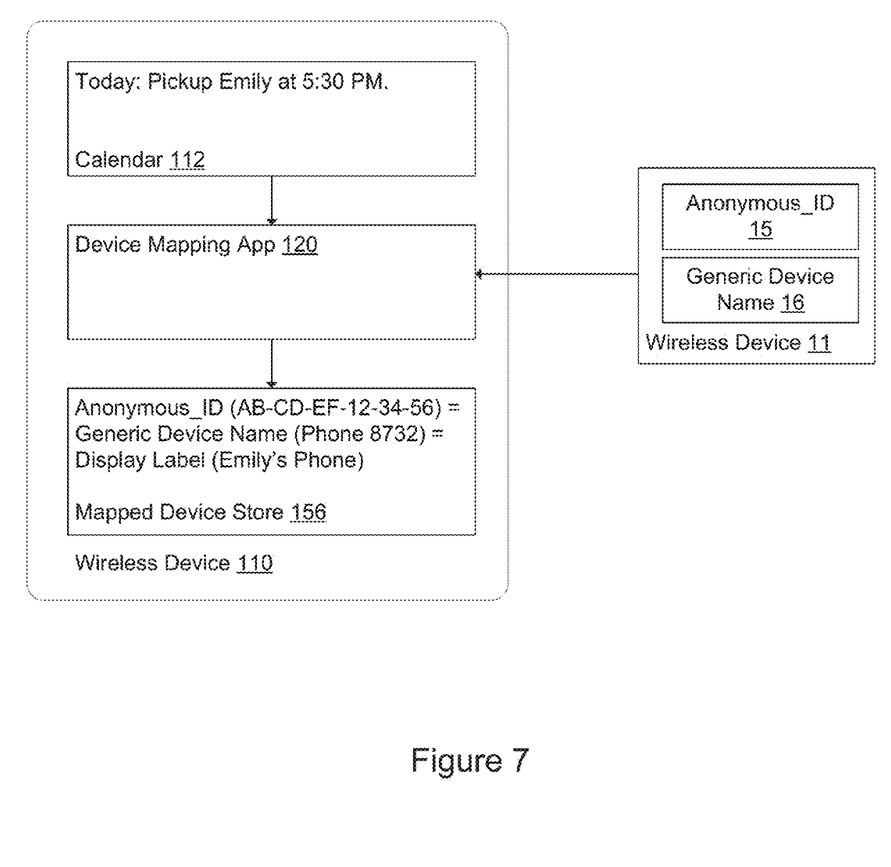
FIG. 7 illustrates an exemplary mapping of a wireless device to a display label using a calendar entry, according to one embodiment

FIG. 7 illustrates a mapping between a wireless device and a display label using a calendar entry, according to one embodiment. As described above, in some instances one event may be sufficient to build enough confidence that an anonymous ID 15 and corresponding generic device name 16 is associated with a particular individual or group. In FIG. 7, the wireless device 11 belongs to Emily. The wireless device 11 has an anonymous ID 15 of AB-CD-EF-12-34-56 and a generic device name 16 of Phone 8732. On the wireless device 110, there is a calendar entry in the calendar 112 to pick up Emily today at 5:30 PM. When an anonymous ID 15 is observed, the device mapping app 120 can evaluate a calendar to determine whether any entries indicate an identity of a user or owner of the observed device. In this example, assume the device mapping app 120 determines with sufficient confidence that the wireless device 11 belongs to Emily when the anonymous ID 15 of AB-CD-EF-12-34-56 is present from, for example 5:32 PM to 5:51 PM, while no other anonymous IDs are present for more than one or two minutes during that time period. Upon determining there is sufficient confidence, the device mapping app 120 generates a display label to represent the anonymous ID 15 of AB-CD-EF-12-34-56, such as Emily's Phone. Once generated, the user of the wireless device 110 could approve and/or alter the display label, such as Emily's Tablet. The mapping can be saved in the mapped device store 156, and the display label Emily's Phone can be displayed at later times when the wireless device 110 is within a communication range of the wireless device 11.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments presented herein may be devised without departing from the basic scope thereof, and the scope thereof is determined by the claims that follow.

What is claimed is:

1. A method of determining a display label for a second wireless device, the method comprising:
   receiving, on a first wireless device, a first set of data including an identifier broadcast from the second wireless device in proximity to the first wireless device, the first set of data including an identifier and a device display name associated with the second wireless device;
   identifying a user in a set of event data available on the first wireless device wherein the first wireless device evaluates the set of event data and the identifier to correlate the identifier of the second wireless device with the user based, at least in part, on correlating a time at which the identifier of the second wireless device is received to time information included in the event data, wherein the correlation is based on a confidence threshold;
   and wherein the confidence threshold is based on feedback from a remote computing-based systems, and wherein the confidence threshold is adjusted based on mapping information received from a plurality of remote computing-based users of the remote computing-based system;
   and upon determining that the identifier from the second wireless device has an association with the user identified in the set of event data, assigning a display label different from the device display name to represent the second wireless device on the first wireless device based on at least the set of event data available on the first wireless device.

2. The method of claim 1, further comprising, upon determining that the identifier from the second wireless device is not associated with the user from the set of event data assigning a generic display label to represent the second wireless device.

3. The method of claim 1, further comprising presenting the assigned display label on a display of the first wireless device indicating the availability of the second wireless device for pairing with the first wireless device.

4. The method of claim 1, wherein the display label identifies a name of the user.

5. The method of claim 1, wherein the display label identifies the user as a member of a group identified in the set of event data.

6. The method of claim 1, wherein determining that the identifier from the second wireless device has the association with the user identified in the set of event data comprises determining that one or more calendar items in the set of event data including the user occur at a time corresponding to a time when the identifier is received on the first wireless device from the second wireless device.

7. The method of claim 1, wherein the set of event data includes data captured each time the identifier broadcast from the second wireless device in proximity to the first wireless device is received by the first wireless device.

* * * * *